United States Patent

Rabow

[15] 3,670,252

[45] June 13, 1972

[54] FREQUENCY MODULATION DEMODULATION SYSTEM

[72] Inventor: Gerald Rabow, Nutley, N.J.

[73] Assignee: International Telephone and Telegraph Corporation, Nutley, N.J.

[22] Filed: June 2, 1969

[21] Appl. No.: 829,399

[52] U.S. Cl. ....................329/112, 329/50
[51] Int. Cl. ....................H03d 3/00
[58] Field of Search ..............325/45, 345, 349, 423; 329/50, 329/108, 112, 122, 145, 146

[56] References Cited

UNITED STATES PATENTS

| | | | |
|---|---|---|---|
| 3,525,945 | 8/1970 | Duente | 329/50 |
| 3,209,271 | 9/1965 | Smith | 329/122 |

*Primary Examiner*—Roy Lake
*Assistant Examiner*—Lawrence J. Dahl
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A combined maximizing-iterative FM demodulator wherein the FM demodulator of an iterative FM demodulator coupled directly to the input for the FM signal to be demodulated is replaced by a maximizing FM demodulator. The maximizing demodulator provides an output signal approximating the input FM signal. The iteration circuit or circuits of the iterative demodulator then operates on this output signal and the input FM signal to provide the demodulated output signal. The coarser the approximation by the maximizing demodulator the less complex is the implementation thereof. The threshold improvement is greater than that achieved with an iterative demodulator alone.

7 Claims, 5 Drawing Figures

INVENTOR
GERALD RABOW
BY Alfred C. Hill
AGENT

INVENTOR
GERALD RABOW
BY Alfred C. Hill
AGENT

INVENTOR
GERALD RABOW
BY Alfred C. Hill
AGENT

FREQUENCY MODULATION DEMODULATION SYSTEM

BACKGROUND OF THE INVENTION

This invention relates to frequency modulation (FM) receivers and more particularly to threshold extending FM demodulators employed therein.

One of the principal problems faced in the design of long range communication systems involves the recovery of modulated signals of relatively low amplitude from a relatively high amplitude of background noise which may result from sources either external to or within the receiver itself. This problem is of paramount importance, for example, in over-the-horizon communication systems, in communication systems employing space satellites as terminal or repeater stations, and in other broadband microwave systems in which the power available in the modulated signal applied to the receiver is limited by other considerations.

It is well known that increases in the signal-to-noise ratio of the demodulated signal can be obtained only by virtue of making a trade between such performance and the radio frequency bandwidth required for the transmission of the baseband or communication signal.

Transmission by FM represents one example of this trade. It is generally accepted that the greater the deviation of the carrier wave, the higher the signal-to-noise performance of the receiver may be. This process, however, cannot be carried out indefinitely and a threshold is reached at which any further increase in the deviation, and, thus, in the bandwidth required in the radio frequency spectrum, is ineffective to improve the signal-to-noise performance.

A special form of FM receiver has been disclosed by J. G. Chaffee in U.S. Pat. No. 2,075,503, Mar. 30, 1937, including a special form of FM demodulator and, variously referred to as a frequency modulation with feedback (FMFB) demodulator, as a frequency compression demodulator or a Chaffee-loop demodulator. This special form of receiver includes conventional frequency modulation receiver circuits, such as a radio frequency amplifier, a mixer and voltage controlled oscillator, an IF amplifier, a limiter, frequency discriminator and baseband amplifier, with the addition of a baseband filter coupled between the output of the frequency discriminator and the voltage controlled oscillator. Briefly, in this type of receiver the frequency of the local oscillator is caused by the feedback circuit to follow variations in the demodulated signal wave. This has the effect of reducing the modulation index at the input of the IF amplifier and will improve the signal-to-noise performance. Although it would appear that the feedback process could continue indefinitely with ever better results, this receiver, also, has a threshold beyond which signal-to-noise improvement does not occur.

As has been recognized in the prior art literature, the amount of a threshold extension obtainable from the Chaffee-loop technique is limited and existing designs of the implementation thereof together with efforts to optimize the various components of the FMFB demodulator and associated receiver components have approached this limit, but will not exceed this limit.

In a first copending application of G. Rabow, Ser. No. 808,116 filed Mar. 18, 1969, there is disclosed therein an iterative FM demodulator which enables achieving a threshold extension exceeding the limit to the threshold extension obtainable from a FMFB demodulator. Briefly, the iterative FM demodulator includes a first FM demodulator coupled to the input for the FM signal to be demodulated and an iteration circuit including a voltage controlled oscillator (VCO) coupled to the output of the first demodulator, a mixer coupled to the input and the output of the VCO and a second FM demodulator coupled to the output of the mixer with the output of the second demodulator and the output of the first demodulator being combined in a summing circuit to provide the demodulated output signal.

As with the conventional FMFB demodulator, the iterative demodulator has a limit to the threshold extension obtainable therewith.

In a second copending application of G. Rabow, Ser. No. 827,183, filed May 23, 1969, there is disclosed a maximizing FM demodulator enabling the optimum threshold extension. Basically, the maximizing demodulator includes a bandpass filter coupled to the input for the FM signal to be demodulated having a passband sufficient to pass only the significant sidebands of the FM signal, an arrangement to sample the output signal of the filter at a rate equal to the reciprocal of the passband of the filter and a computer to determine the amplitude $A_i$ of the FM signal and the phase $\theta_i$ of an estimated noise with respect to an estimated FM signal for each sample and compute from these values the most likely modulating signal, this signal being the demodulated output signal of the maximizing demodulator.

While the demodulator of this second copending application provides the optimum threshold extension, a threshold extension of $\sqrt{B}$ greater than that achieved by a conventional FMFB demodulator, where B is the modulation index, the use of a computer makes the demodulator rather complex and is usable only in systems where complexity is not a practical restraint, and the primary consideration is that of obtaining optimum threshold extension.

SUMMARY OF THE INVENTION

Therefore, an object of the present invention is to provide still another new FM demodulator whose implementation is less complex than the implementation of the maximizing FM demodulator of said second copending application, but yet has a threshold improvement approaching that of said maximizing FM demodulator.

Another object of the present invention is to provide a new FM demodulator which is less complex than the maximizing FM demodulator of said second copending application, but yet has a threshold improvement greater than the iterative FM demodulator of said first copending application.

Still another object of the present invention is to provide a new FM demodulator combining the techniques of the maximizing FM demodulator of said second copending application and the iterative FM demodulator of said first copending application with a threshold improvement approaching that achieved with said maximizing FM demodulator.

A further object of the present invention is to provide a new FM demodulator incorporating the components of the iterative FM demodulator of said first copending application, but modified to the extent that the first FM demodulator stage thereof is replaced by a maximizing type FM demodulator employing the techniques, but having a less complex implementation than is disclosed in said second copending application.

A feature of the present invention is the provision of an FM demodulation system comprising an input for an FM signal to be demodulated; a maximizing FM demodulator coupled to the input; and at least one iteration circuit coupled to the input and the output of the maximizing demodulator to provide the demodulated output signal.

Another feature of this invention is the provision of connecting one or more iteration circuits in cascade with each other and the output of the one iteration circuit to achieve a further increase in the amount of threshold extension obtainable.

Still another feature of this invention is the provision of a maximizing FM demodulator including a first means to generate N different waveforms, where N is an integer greater than one, second means coupled to the input and the first means to determine which one of the N waveforms is the closest approximation to the modulating signal of the FM signal and produces a control signal identifying the one of the N waveforms, and third means coupled to the first means and the second means responsive to the control signal to provide at the output of the maximizing demodulator the one of the N waveforms.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENT

Figure 1:
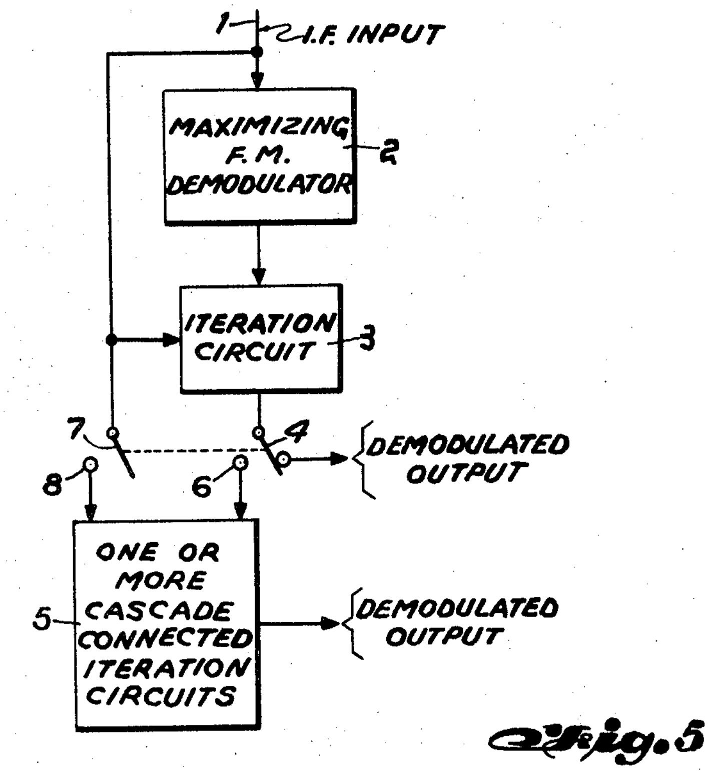
FIG. 1 is a general block diagram of the combined maximizing-iterative FM demodulator in accordance with the principles of this invention.

By combining the maximizing and iterative principles of said first and second copending applications, a less complex arrangement is provided for approximating the optimum detection process.

The necessity for complex computations by a computer to achieve the optimum maximizing performance as disclosed in said second copending application can be circumvented by employing approximate computation. An approximate computation constitutes a demodulator with the desired low threshold, but with relatively poor output S/N (signal-to-noise ratio). This,however, is exactly the characteristic of the first FM demodulator stage of the iterative demodulator of said first copending application. The approximation required for the maximizing demodulator than need only be good enough to permit subsequent iterations to converge. Such a combined system is a practical means for larger threshold extensions (at sufficiently high B) than can be attained by the iterative technique only.

The complexity of the maximizing demodulator can be reduced by making approximations to the calculations presented in said second copending application. The coarser the approximations, the less complex the implementation. An approximate solution has effectively more output noise, i.e., smaller S/N out than an exact solution. In other words, an approximate maximizing solution has exactly the properties required of the first demodulator in the iteration demodulator of said first copending application, i.e., ideal threshold performance, but relatively low output S/N, and, thus, it can be used as the first demodulator of the iterative demodulator.

The coarseness of the approximation required of the first stage maximizing demodulator depends on how much improvement is possible and desired relatively to a conventional FM demodulator, such as an FMFB demodulator, as employed as the first stage of the iterative demodulator disclosed in said first copending application. A rather crude approximation can give large threshold improvement, and such a crude approximation is probably adequate in most practical cases. Such an approximation can be obtained by considering a limited set of modulating signals, and finding which of these is closest to the actual modulating signal. This can be implemented by modulating a voltage controlled oscillator with a candidate signal, mixing each of the resultant signals with the input FM signal and then passing each mixer output through a filter just wide enough to pass the original modulating signal minus the best approximation. The modulating signal selected as the approximate maximizing demodulator output is that which most nearly corresponds to the filter output, since that will have the most signal energy within the filter bandwidth.

The simplest candidate signals are a number of different frequency deviations of a sample interval, independent of the signal at other sampling intervals. A more complex set of candidate signals would be the combinations of the known subsequent behavior of detected previous samples, $m_1$ possible present sample values, and $m_2$ possible next sample values, giving $m_1$ $m_2$ candidate signals. $m_1$ would be made much greater than $m_2$, since the present sample value has a much greater influence.

Referring to FIG. 1, there is disclosed therein a combined maximizing-iterative FM demodulator in accordance with the principles of this invention and includes an input 1 to which the FM signal is applied. Input 1 is coupled to maximizing FM demodulator 2 and also to iteration circuit 3 whose other input is coupled to the output of demodulator 2. The output of circuit 3 is coupled through switch 4 in the position illustrated to provide the demodulated output signal. Where it is desired to obtain a greater threshold extension one or more cascade connected iteration circuits 5 are coupled to the input 1 and the output of iteration circuit 3 by moving switch 4 to contact 6 and switch 7 to contact 8. The last of circuits 5 will provide the demodulated output signal for the combined maximizing-iterative FM demodulator.

Figure 2:
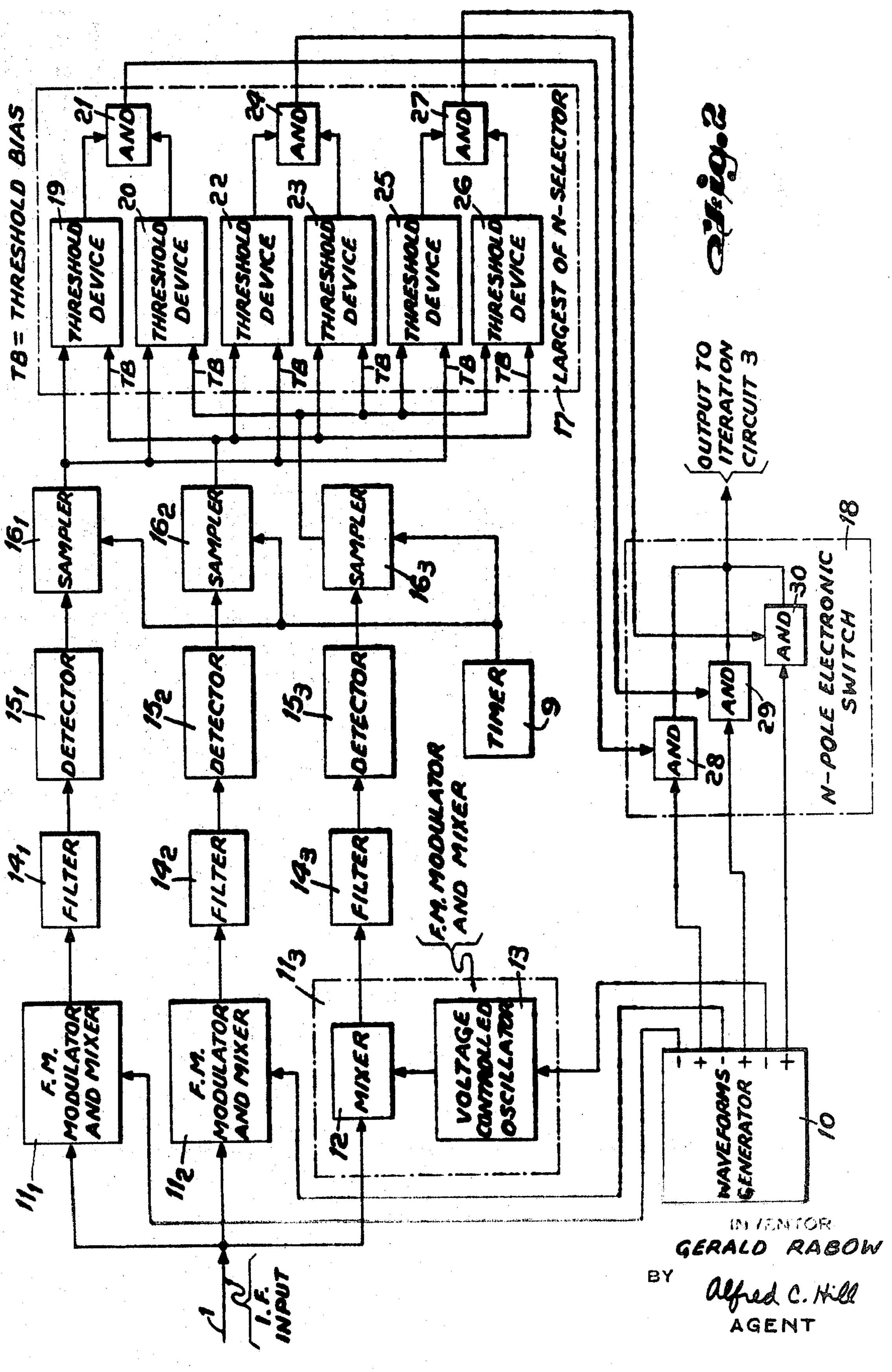
FIG. 2 is a block diagram of one typical embodiment of the maximizing FM demodulator of FIG. 1.

Referring to FIG. 2 there is illustrated therein one typical embodiment of maximizing FM demodulator 2 which operates at each time interval, as determined by timer 9, to select one of N waveforms for application to iteration circuit 3 as produced in waveforms generator 10. For the circuit disclosed in FIG. 2 N=3. In its simplest form the N waveforms of generator 10 are constant amplitude of different magnitude and polarity distributed over the expected baseband or modulating signal of the FM signal at input 1.

N signal channels are coupled to input 1 and the operation thereof is controlled by a different one of the waveforms from generator 10. As illustrated each of the channels includes an FM modulator and mixer 11 coupled to input 1. As illustrated in FM demodulator and mixer $\mathbf{11_3}$, mixer 12 is coupled to input 1 and the output of a voltage controlled oscillator 13 is coupled to mixer 12. Oscillator 13 is frequency modulated by the negative of the associated waveform from generator 10. Each of the signal channels also include a filter 14 coupled to the output of the mixers of components 11, each of the filters 14 having identical bandpasses. The bandwidth of the filters 14 is the smallest possible, consistent with passing most of the signal energy through one of the filters 14. That is, one waveform from generator 10 will be the closest to the modulation of the FM signal on input 1 and the residual modulation at the output of modulator and mixers 11 will be small, its bandwidth occupancy will be small and most of the energy will pass through that particular filter. Thus, one of filters 14, the filter 14 associated with the signal channel which is associated with the waveform from generator 10 which comes closest to the modulating signal of the FM input signal, will have its output signal maximized. The output of each filter is detected in detectors 15 and sampled by samplers 16 at times determined by timer 9 which operates at a bit rate consistent with the bandwidth of filters 14, such as a rate equal to the reciprocal of the bandwidth of filters 14. The output from samplers 16 are coupled to the largest of N selector 17 which determines which one of the N signal channels has the largest output energy at any sampling interval and will produce a control signal identifying this channel. The control signal will control the operation of N-pole electronic switch 18 to couple the waveform of generator 10 causing the associated channel to have the largest output to iteration circuit 3.

For purposes of illustration,selector 17 and switch 18 have disclosed in block form one possible implementation thereof. Selector 17 includes threshold device 19 and threshold device 20 coupled to the output of sampler $\mathbf{16_1}$. The threshold bias for device 19 is provided by the output signal of sampler $\mathbf{16_2}$ and the threshold bias for device 20 is provided by the output signal of sampler $\mathbf{16_3}$. Thus, threshold devices 19 and 20 will both provide an output if the output from sampler $\mathbf{16_1}$ is greater than the output of either of the other two samplers. An AND gate 21 is coupled to the output of devices 19 and 20 and will provide a control signal identifying the first channel and, hence, the waveform of generator 10 associated therewith, if the output signal of sampler $\mathbf{16_1}$ is greater than both the output signals of samplers $\mathbf{16_2}$ and $\mathbf{16_3}$. Threshold devices 22 and 23 together with AND 24 will provide a control signal, if the output signal of sampler $16_2$ is greater than the output signal of both samplers $16_1$ and $16_3$. Threshold devices 25 and 26 together with AND 27 will provide a control signal, if the output signal of sampler $16_3$ is greater than both the output signals of samplers $16_1$ and $16_2$. The control signal outputs of AND gates 21, 24 and 27 are coupled to AND gates 28, 29 and 30, respectively, to control the coupling of the associated waveform of generator 10 to iteration circuit 3 in a well known manner, namely, that the appropriate control signal must be present at the proper one of AND gates 28, 29 or 30 to provide the desired output waveform to iteration circuit 3.

Figure 3:
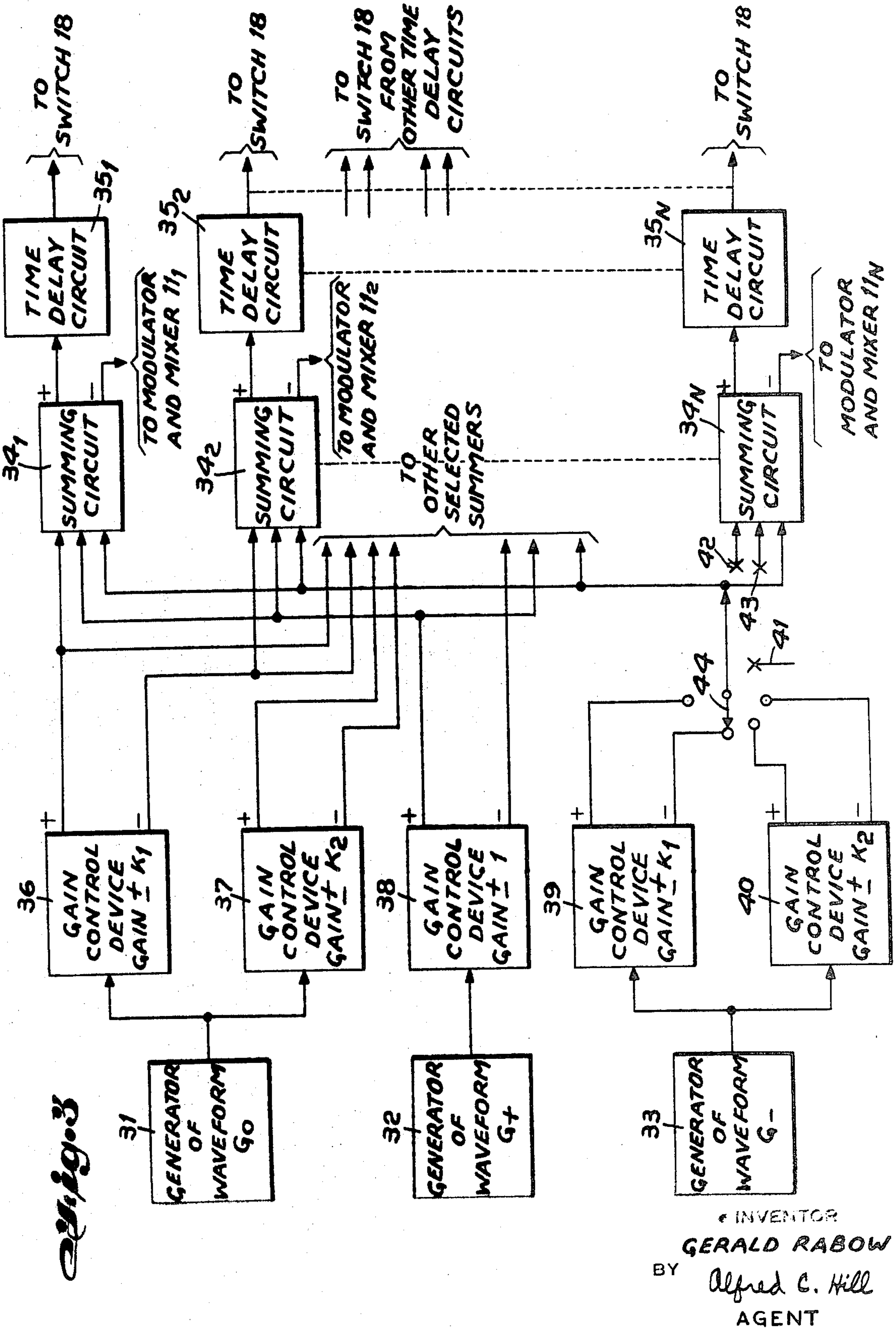
FIG. 3 is a block diagram of one embodiment of the waveforms generator of FIG. 2.

Referring to FIG. 3, a more complex form of generator 10 (FIG. 2), is illustrated. The different waveforms generated in this arrangement is determined by the modulation at the previous and next sample times as well as that at the present sample time. Each waveform is the composite of three waveforms, the addition of the elemental waveforms $G_o$, $G_+$, $G_-$ generated by generators 31, 32 and 33, respectively is accomplished in summing circuits $34_1$ to $34_N$. The negative outputs of the summing circuits go to the FM modulator and mixers $11_1$ to $11_N$. The positive outputs of circuits $34_1$ to $34_N$ are coupled to switch 18 through a time delay circuit $35_1$ to $35_N$ with each of the delay circuits having a delay of one sample time. The delay is required so that the waveform coupled through switch 18 to the output of the maximizing demodulator and, hence, to the input of iteration circuit 3 (FIG. 1) is the same as that which matched the incoming modulation to maximize the output of one of the filters 14.

Figure 4:
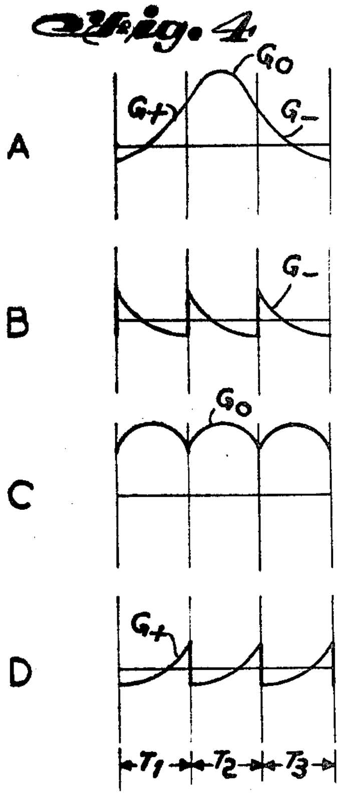
FIG. 4 illustrates a set of curves useful in explaining the operation of the waveforms generator of FIG. 3.

The three waveforms from generator 31, 32 and 33 which are summed in summing circuits $34_1$ to $34_N$ are all portions of sin $Kt/t$ waveforms shown in Curve A, FIG. 4 and labeled $G_o$, $G_+$, $G_-$. The waveforms generated in generators 31, 32 and 33 to provide the combined waveform are illustrated in Curves B, C, D, FIG 4, respectively, with the combined output (Curve A) being that output present, for instance, at the output of summing circuit $34_1$. Time intervals $T_1$, $T_2$ and $T_3$ are equal. There is waveform within each of the intervals. Waveform $G_o$ in Curve C is identical with waveform $G_o$ in Curve A, etc. The waveforms of generators 31, 32 and 33 could be produced in many ways. One possibility is as the sum of harmonically generated sinewaves, each of proper amplitude and phase (i.e., the Fourier series expansion). Another is by starting with sawtooth waves for waveforms $G_-$ and $G_+$ then refining the shape of these waveforms with a non-linear circuit composed of diodes and resistors, and three phase rectification for waveform $G_0$ and then refining with diodes and resistors. Another method is actually generating sin Kt/t waves by applying sharp pulses to bandpass filters, then gating out the proper portions.

By inserting various positive or negative gains by means of gain control devices 36, 37, 38, 39 and 40 between the generators 31, 32 and 33 and the summing circuits $34_1$ to $34_N$ as illustrated, or by inserting zero transmittance by leaving a connection open as illustrated by leads 41, 42 and 43, it is possible to obtain various combinations of waveforms $G_o$ and $G_+$. In FIG. 3, there are illustrated five values multiplying waveform $G_o$, namely, $\pm K_1$, $\pm K_2$ and 0 and three values multiplying waveform $G_+$, namely, ±1 and 0, so that 15 combinations requiring 15 summing circuits 34 and time delay circuits 35 are required although only three are actually shown. Since the amplitude of waveform $G_-$ pertains to the previous sample and is, hence, known, the same value is applied to each summing circuit 34. This value is selected by switch 44 in accordance with which waveform was selected during the previous sample. Switch arm 44 selects one of five gains corresponding to the one associated with waveform $G_o$ in the previous sample.

Figure 5:
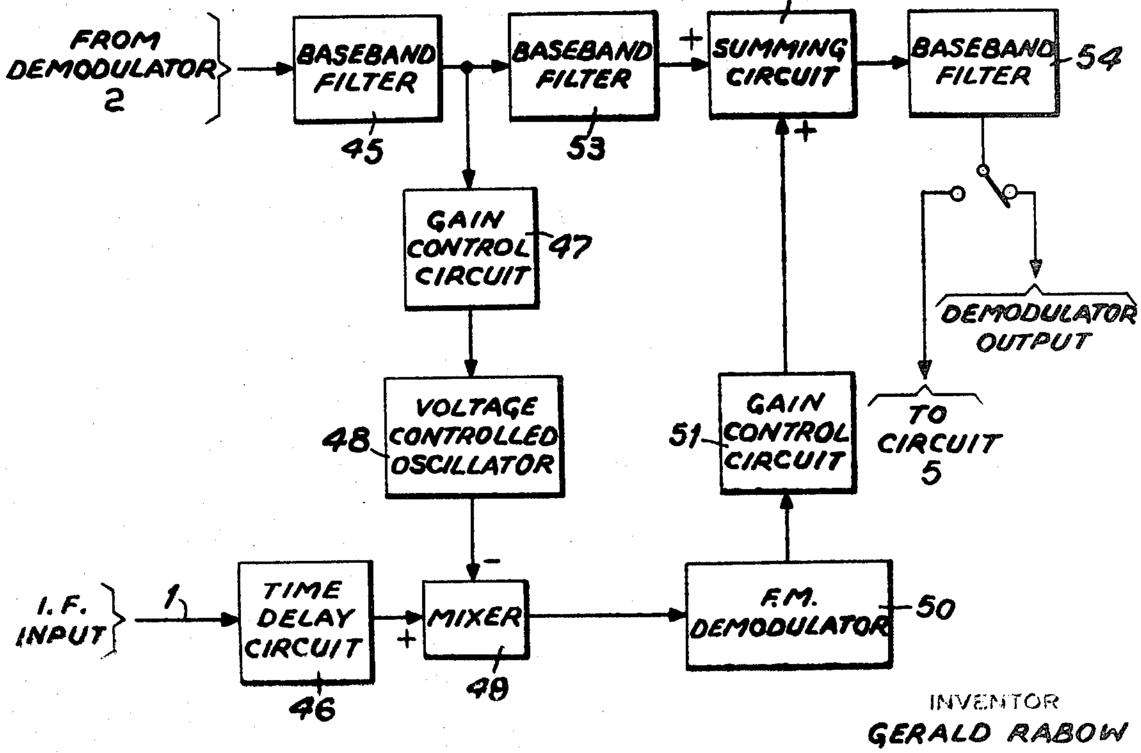
FIG. 5 is a block diagram of the iteration circuit of FIG. 1.

Referring to FIG. 5, there is illustrated therein the block diagram of one typical embodiment of iteration circuit 3 (FIG. 1). The output of demodulator 2 (FIG. 1) is coupled to baseband filter 45 which provides an output signal including the desired demodulated signal contaminated by noise or digitization error. The FM signal on input 1 is coupled through time delay circuit 46 whose delay just equals the delay of the combination of of demodulator 2 and filter 45. The signal at the output of filter 45 is coupled through gain control circuit 47 to modulate voltage controlled oscillator 48, the output of which is coupled to mixer 49. The other input of mixer 49 is the delayed FM signal from circuit 46. The gain control of circuit 47 is adjusted so that the signal component of the input to mixer 49 from oscillator 48 is just equal to the signal component of the input from circuit 46 and, hence, cancels it. The output of mixer 49 is coupled to FM demodulator 50 and, hence through gain control circuit 51 whose output provides one input for summing circuit 52, the other input to summing circuit 52 being provided by baseband filter 53 coupled to the output of baseband filter 45. The operation of summing circuit 52 is to reduce one of the noise components present in the output signal of filter 45 by means of the output signal from demodulator 50. The output from circuit 52 is passed through baseband filter 54 to provide through switch 4 in the position illustrated the demodulated output signal. Filter 54 is a sharp cut-off low pass filter to eliminate any part of one of the noise components not within the baseband. If one or more cascade connected iteration circuits 5 are to be employed switch 4 would be moved to contact 6. The above description of FIG. 5 has only dealt with the actual circuit configuration and the operation thereof has not been described herein in detail, since these operational details are clearly set forth in said first copending application.

While I have described above the principles of my invention in connection with specific apparatus, it is to be clearly understood that this description is made only by way of example.

I claim:

1. A frequency modulation demodulation system comprising:

an input source for a frequency modulated signal to be demodulated;

a maximizing frequency modulation demodulator having an input coupled to said input source and an output, said maximizing demodulator including first means to generate N different waveforms, each of said waveforms having a different magnitude and selected polarity, where N is an integer greater than one, second means coupled to said input source and said first means to determine in accordance with said magnitude and selected polarity which one of said N waveforms is the closest approximation to the magnitude and polarity of the modulating signal of said frequency modulated signal and produce a control signal identifying said one of said N waveforms, and third means coupled to said first means, said second means and said output of said maximizing demodulator responsive to said control signal to provide at said output of said maximizing demodulator said one of said N waveforms; and at least one iteration circuit having an output, a first input coupled to said input source and a second input coupled to said output of said maximizing demodulator to provide at said output of said one iteration circuit the demodulated output signal of said demodulation system, said one of said iteration circuit including a voltage controlled oscillator coupled to said second input of said one iteration circuit, fourth means coupled to said first input of said one iteration circuit and the output of said oscillator to combine the output signals thereof, a first frequency modulation demodulator coupled to the output of said fourth means, and fifth means coupled to said output of said iteration circuit, said output of said maximizing demodulator and the output of said first demodulator to combine the output signals of said maximizing demodulator and said first demodulator and provide said demodulated output signal of said demodulation system at said output of said iteration circuit.

2. A system according to claim 1, wherein said first means includes means to generate N constant amplitude waveforms each having a different magnitude and selected polarity distributed over the frequency band of the expected modulating signal.

3. A system according to claim 1, wherein said first means includes a plurality of sources each providing a different elemental waveform, and means coupled to said plurality of sources to predeterminedly combine selected portions of said plurality of elemental waveform to generate said N waveforms.

4. A system according to claim 1, wherein said second means includes a timing means operating at a given rate, N signal channels equal in number to said N waveforms coupled to said input source and said first means, each of said channels being responsive to a different one of said N waveforms, each of said channels including a first modulator coupled to said first means responsive to the associated one of said N waveforms, a mixer coupled to said input source and said modulator, a filter having a predetermined bandwith coupled to the output of said mixer, a detector coupled to the output of said mixer, and a sampler coupled to the output of said detector and the output of said timing means, and selector means coupled to the output of each of said samplers to determine which of said channels passes the largest amplitude signal therethrough and produce said control signal identifying said associated one of said N waveforms.

5. A system according to claim 4, wherein said third means includes N switch means equal in number to said N waveforms coupled to said first means and said selector means, each of said switch means being coupled to a different one of said N waveforms and the appropriate one of said switch means being responsive to said control signal to provide said associated one of said N waveforms at said output of said maximizing demodulator.

6. A system according to claim 1, wherein said third means includes N switch means equal in number to said N waveforms coupled to said first means and said second means, each of said switch means being coupled to a different one of said N waveforms and the appropriate one of said switch means being responsive to said control signal to provide said one of said N waveforms at said output of said maximizing demodulator.

7. A system according to claim 2, further including at least one additional iteration circuit identical to said one iteration circuit, said additional iteration circuit having an output identical to said one iteration circuit, a first input identical to said one iteration circuit coupled to said input source and a second input identical to said one iteration circuit coupled in cascade with said output of said one iteration circuit to provide at said output of said additional iteration circuit said demodulated output signal of said demodulation system.

* * * * *